(12) United States Patent
Racz

(10) Patent No.: US 12,299,765 B2
(45) Date of Patent: May 13, 2025

(54) STEGANOGRAPHIC TECHNIQUES FOR TRACKING VIDEO ACCESS EVENTS

(71) Applicant: GENETEC INC., Saint-Laurent (CA)

(72) Inventor: Pierre Racz, Montreal (CA)

(73) Assignee: GENETIC INC., Saint-Laurent (CA)

( * ) Notice: Subject to any disclaimer, the term of this patent is extended or adjusted under 35 U.S.C. 154(b) by 671 days.

(21) Appl. No.: 17/244,194

(22) Filed: Apr. 29, 2021

(65) Prior Publication Data

US 2022/0351323 A1    Nov. 3, 2022

(51) Int. Cl.
| | |
|---|---|
| *H04N 7/173* | (2011.01) |
| *G06F 21/16* | (2013.01) |
| *G06T 1/00* | (2006.01) |
| *H04N 21/8358* | (2011.01) |
| *H04N 21/845* | (2011.01) |
| *G06F 21/10* | (2013.01) |

(52) U.S. Cl.
CPC ............ *G06T 1/0085* (2013.01); *G06F 21/16* (2013.01); *H04N 21/8358* (2013.01); *H04N 21/8456* (2013.01); *G06F 21/1063* (2023.08)

(58) Field of Classification Search
CPC ........... G06T 1/0085; G06T 2201/0051; G06T 1/0071; G06F 21/16; G06F 21/1063; H04N 21/8358; H04N 21/8456
See application file for complete search history.

(56) References Cited

U.S. PATENT DOCUMENTS

| | | | |
|---|---|---|---|
| 8,848,969 B2 | 9/2014 | Ramsdell et al. | |
| 9,009,482 B2 | 4/2015 | Winograd | |
| 9,330,429 B2 | 5/2016 | Barnes et al. | |
| 9,883,255 B2 | 1/2018 | Perry | |
| 10,354,354 B2 | 7/2019 | Zhao et al. | |
| 2007/0130467 A1* | 6/2007 | Beck .................... | G06T 1/0021 |
| | | | 713/176 |
| 2013/0335783 A1* | 12/2013 | Kurtz .................... | G06K 1/121 |
| | | | 358/3.28 |

(Continued)

OTHER PUBLICATIONS

Milano, Dominic. "Content control: Digital watermarking and fingerprinting." White Paper, Rhozet, a business unit of Harmonic Inc., http://www. rhozet. com/whitepapers/Fingerprinting-Watermarking. pdf, Last accessed May 30, 2012.

*Primary Examiner* — Annan Q Shang

(57) ABSTRACT

Provided is a computer-implemented video processing method. The method comprises receiving a stream of original images related to a video access event and creating a stream of output images corresponding to the original images. The output images include first images comprising a hidden digital forensic marker and second images comprising a visible digital forensic marker. The hidden marker and the visible marker each encode information related to the video access event. The stream of output images is output onto a network or caused to be displayed on a screen. The visible marker serves as a deterrent for distribution or recording, and if an attempt is made to remove it, the hidden marker remains in the image, allowing the information relevant to the video access event to be recovered. Also provided are a method of integrity detection for a stream of images containing markers, and a method of embedding a dynamic marker.

32 Claims, 15 Drawing Sheets

(56) References Cited

U.S. PATENT DOCUMENTS

| | | | | |
|---|---|---|---|---|
| 2014/0013374 A1* | 1/2014 | Oh | ............... | H04N 21/8586 |
| | | | | 725/112 |
| 2014/0032322 A1* | 1/2014 | Schwieger | ............ | G06Q 30/02 |
| | | | | 705/14.55 |
| 2014/0089959 A1* | 3/2014 | Oh | ............... | H04N 21/23892 |
| | | | | 725/24 |
| 2015/0221316 A1* | 8/2015 | Mufti | ............... | G10L 19/018 |
| | | | | 700/94 |
| 2016/0050468 A1* | 2/2016 | Morten | ............ | H04N 21/8358 |
| | | | | 725/28 |
| 2016/0056468 A1* | 2/2016 | Miyamoto | ............ | H01M 4/13 |
| | | | | 429/162 |
| 2016/0253772 A1* | 9/2016 | Kofod | ............... | G06T 1/0021 |
| | | | | 382/100 |
| 2018/0295172 A1 | 10/2018 | Vikramaratne | | |
| 2019/0340341 A1* | 11/2019 | Fleck | ............... | H04L 63/20 |
| 2020/0206635 A1* | 7/2020 | Mojarad | ............... | A63F 13/355 |
| 2021/0365233 A1* | 11/2021 | Grady | ............... | G10H 1/0083 |

\* cited by examiner

Image with visible markers

Image with visible markers and additional marker

Image with only additional marker

STEGANOGRAPHIC TECHNIQUES FOR TRACKING VIDEO ACCESS EVENTS

FIELD

The present disclosure is related to video processing and, in particular, to techniques, such as steganographic techniques, for the marking of digital images.

BACKGROUND

In a video management system, video footage may be downloaded or viewed from different devices or by different users. Privacy and other considerations may impose legal limits on the manner in which the video footage may be stored or disseminated. To enforce such restrictions, some technology solutions have been attempted.

For example, a common "line of defense" against unauthorized access to video footage involves digital access control, such as by way of user credentials or biometrics. This can limit the pool of users having access to the video. However, once the video has been retrieved and/or is being played back, further actions by the user or someone in the same room may compromise the security of the video footage. This includes exporting the video and recording the video. To prevent unauthorized export of the video, this may be controlled in software such that the video cannot be saved (e.g. as an mpeg file) but remains within an evidence management system. However, this still does not prevent someone from recording the scene being viewed, and the person having done so would remain anonymous.

Thus, even when existing technological measures are implemented, there remain situations in which video footage may be inappropriately viewed or disseminated ("leaked"), with few barriers yet possibly serious consequences. For example, leaked footage may carry personal and identifying information on the subjects captured, and it may not be legal to publish it. In other cases, leaked footage may carry confidential or trade secret information, which can cause economic damage to the organization from where the footage is leaked.

It would therefore be desirable to apply a technological solution that serves as a deterrent to the unauthorized viewing or downloading of video footage, while allowing the source of a leak to be traced, should it occur.

SUMMARY

In accordance with a first aspect, there is provided a computer-implemented video processing method, which comprises: receiving a stream of original images related to a video access event; creating a stream of output images corresponding to the original images, wherein the output images include first images comprising a hidden digital forensic marker and second images comprising a visible digital forensic marker, the hidden marker and the visible marker encoding information related to the video access event; and outputting the stream of output images onto a network or causing the stream of output images to be displayed on a screen.

In accordance with a second aspect, there is provided a video processing method, which comprises: receiving a stream of digital images; detecting a first digital forensic marker comprised in the digital images; determining whether the stream of digital images comprises a second digital forensic marker associated with the first digital forensic marker; and taking an action based on the determining.

In accordance with a third aspect, there is provided a video processing method, which comprises: receiving a stream of original images related to a video access event; creating a stream of output images corresponding to the original images, wherein the output images comprise a digital forensic marker, the marker encoding information related to the video access event, the marker having at least one property that varies among the output images; and outputting the stream of output images onto a network or causing the stream of output images to be displayed on a screen.

In accordance with other aspects, there is provided a non-transitory computer-readable storage medium comprising computer-readable instructions which, when executed by at least one processor of a computing apparatus, cause the computing apparatus to carry out any of the above methods.

DETAILED DESCRIPTION

Figure 1:
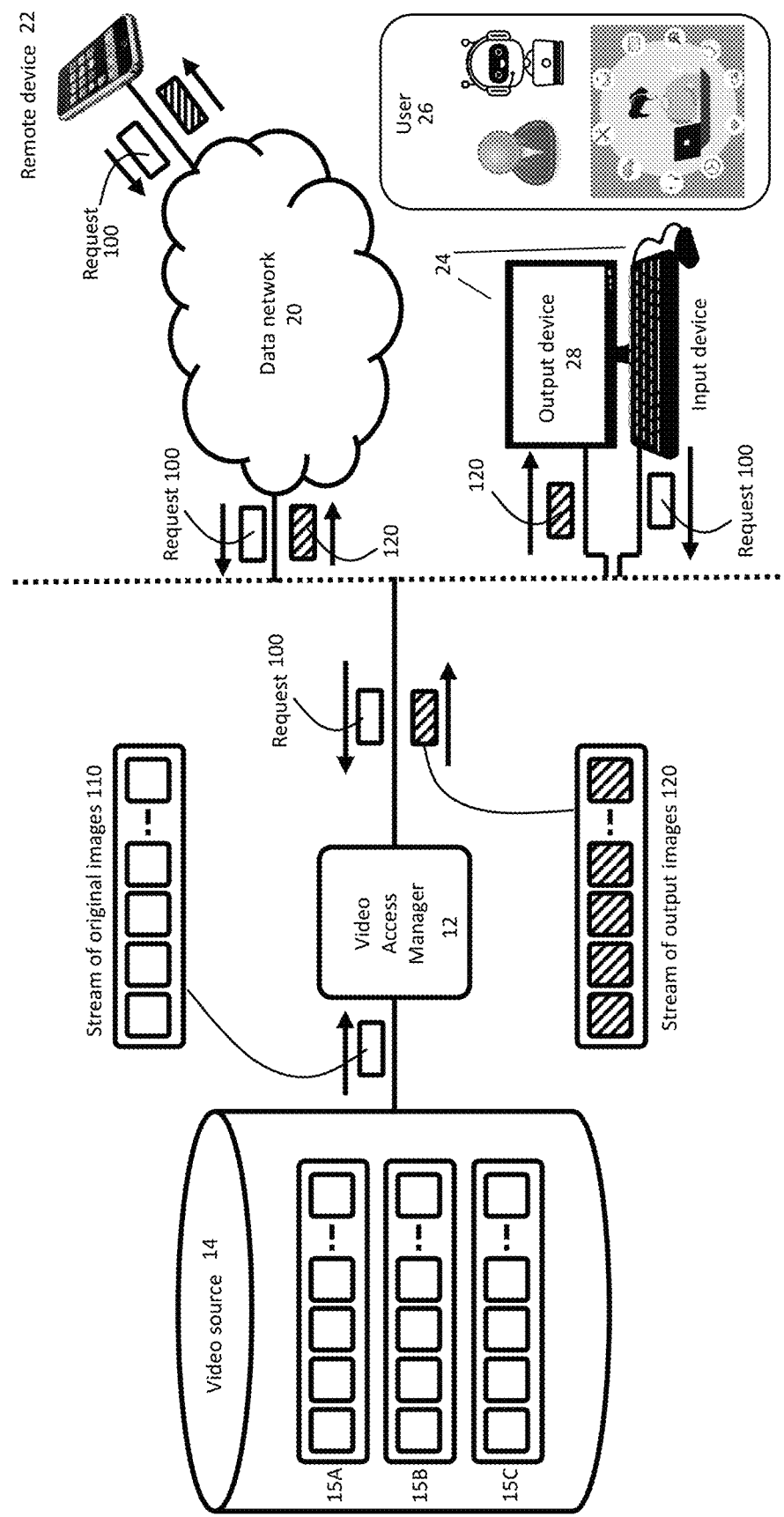
FIG. 1 is a block diagram showing a video access system, in accordance with a non-limiting embodiment.

FIG. 1 is a block diagram showing a video access system, in accordance with a non-limiting embodiment. The video access system comprises a video access manager 12 connected to a video source 14. The video source 14 stores and/or provides streams of digital images 15A, 15B, 15C. A given stream of digital images may correspond to images previously recorded by a camera in a particular location during a particular period of time. In other cases, a given stream of digital images may correspond to frames of a motion picture (movie).

The video access manager 12 is configured to receive a request 100, which can be a request for video access (e.g., playback). The request 100 may be embedded or encoded in one or more data packets. In some embodiments, the request 100 is received over a data network 20 (e.g., the Internet) from a remote device 22. The data network 20 may include a local area network (LAN), a general wide area network (WAN), and/or a public network (e.g., the Internet). In other embodiments, the request 100 is caused to be issued by a local device 24 (e.g., a console) under control of a user 26. Depending on the circumstances, the user 26 may be a human, a bot or an online service, for example.

Figure 7:
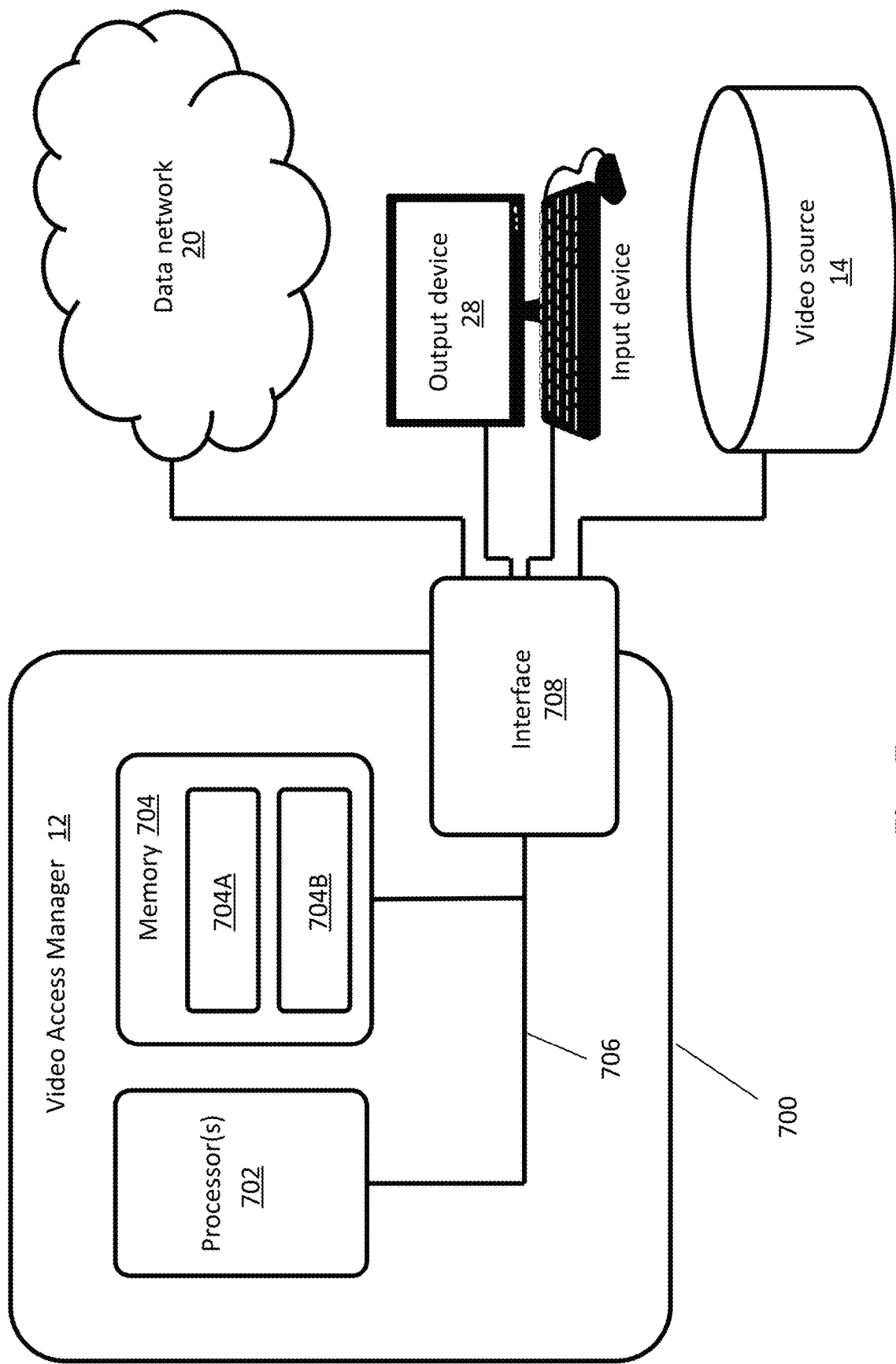
FIG. 7 is a block diagram showing elements of a video access manager embodied as a computing system.

The video access manager 12 may be embodied as a computing apparatus, as shown in FIG. 7. The computing apparatus 700 comprises a memory 704 and one or more processors 702. The memory 704 is configured to store computer-readable instructions, such as program modules 704A, 704B, executed by the one or more processors 702. Examples of the program modules 704A, 704B include routines, programs, objects, components, logic, data structures, operating systems and so on that carry out particular tasks, algorithms or functions. The computing apparatus 700 may be implemented in distributed cloud computing environments where tasks are performed by remote processing devices that are linked through a communications network. In such a distributed cloud computing environment, the program modules may be located in both local and remote storage media including memory storage devices.

Part of all of the memory 704 may be embodied as volatile memory, such as random-access memory (RAM) and/or cache memory. Part or all of the memory 704 may be embodied as other removable/non-removable, volatile/non-volatile computer system storage media. By way of example, the memory 704 may include a storage system for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided as part of the memory 704.

The computing apparatus 700 may also comprise an interface 708 for communicating with various local devices (such as the local device 24). The interface 708 may also comprise a network card, modem or adapter for communicating with remote devices (such as the remote device 22) over a network (such as the data network 20). The interface 708 may also be adapted for communication with various databases (such as the video source 14).

Various components of the computing apparatus 700 (e.g., the one or more processors 702, the memory 704 and the interface 708) may be interconnected by a bus 706. The bus 706 may include any of several types of bus structures, including a memory bus or memory controller, a peripheral bus, and a processor or local bus using any of a variety of bus architectures. By way of example, and not limitation, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Returning to FIG. 1, the video access manager 12 is configured to access the video source 14 based on the request 100 to obtain a stream of digital images 110, referred to as a stream of "original images". The stream of original images 110 is received by the video access manager 12 and the video access manager 12 is then configured to create a stream of output images 120 corresponding to the original images. The stream of output images 120 can be sent onto the data network 20. Alternatively, the stream of output images 120 is caused to be displayed on an output device 28 such as a screen, or it can be transmitted back to the video source 14 for storage therein.

The request 100 is an example of a "video access event", which may correspond to an attempt by the user 26 to access images in the video source 14. The video access event and therefore the request 100 may be characterized by at least one of (i) the user 26 associated with the request 100; (ii) the device 22, 24 associated with the request 100; and (iii) a timestamp (including a date) associated with the request 100. It is recalled that the user 26 may be a human, a bot or an online service, depending on the implementational considerations.

The video access manager 12 carries out one or more methods of creating the stream of output images from the stream of input images, depending on the manner in which the program modules 704A, 704B are programmed. For example, each of the program modules 704A, 704B may represent a different embodiment of a video processing method, as described herein below.

Dual Marker Embodiment

In accordance with a first non-limiting embodiment (referred to as the "dual marker" embodiment), execution of the video processing method results in the output images including first images comprising a hidden digital forensic marker and second images comprising a visible digital forensic marker.

A visible marker as used herein refers to a graphical effect appearing in an image or in a succession of images and that is noticeable in the image to the naked eye. A hidden marker as used herein refers to a graphical effect appearing in an image or in a succession of images and that is imperceptible in the image to the naked eye.

The assessment of noticeability or imperceptibility may take into account the presence or absence of other markers. For example, it should be understood that where reference is made to "a" marker, be it hidden or visible, this could refer to plural markers. As such, it is envisaged that having a large number of markers that would be individually noticeable if they were the only marker in the image, may nonetheless confuse the viewer to the point where the absence or presence of a single one these markers might not be noticed by the viewer in the context of all the other markers that are present.

Figure 10A:
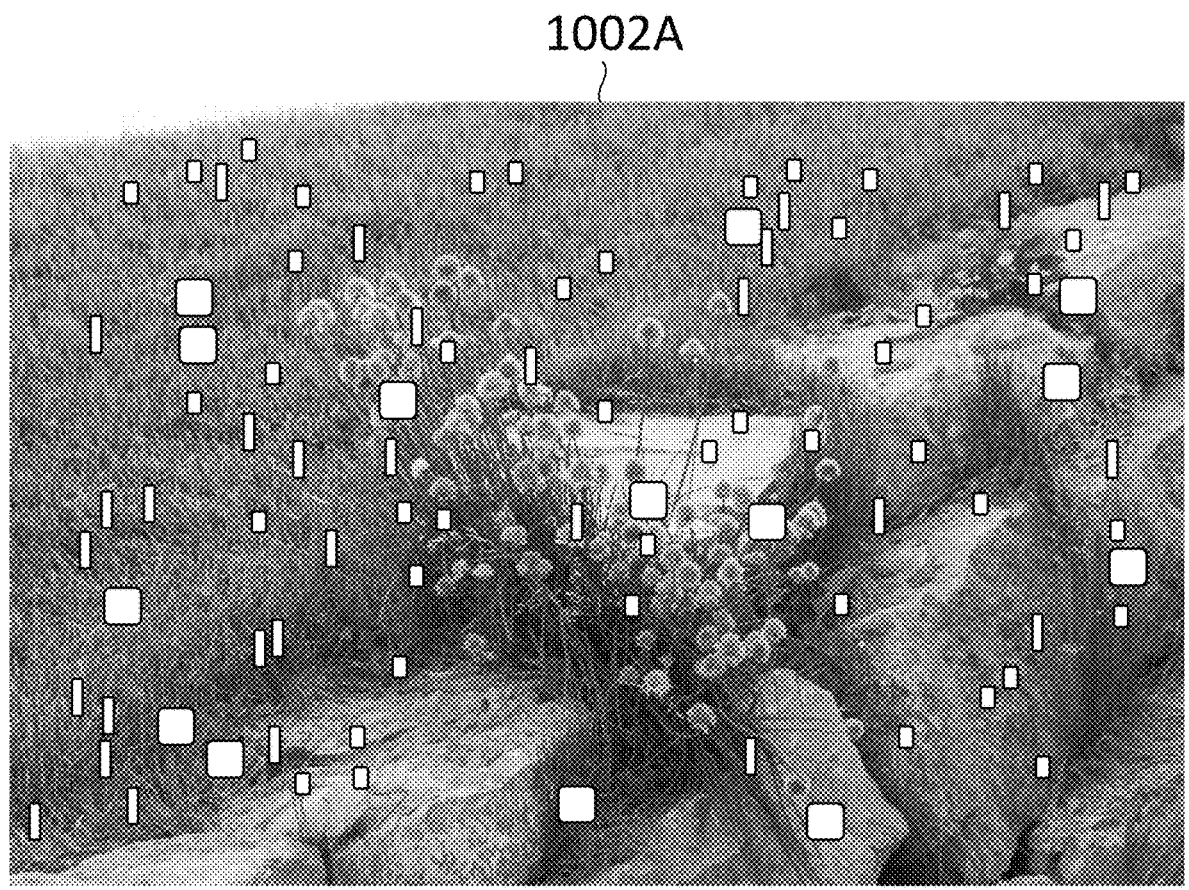
FIGS. 10A-10D show an embodiment in which a plurality of visible markers obfuscate a hidden marker that would otherwise be visible in isolation.
Figure 10B:
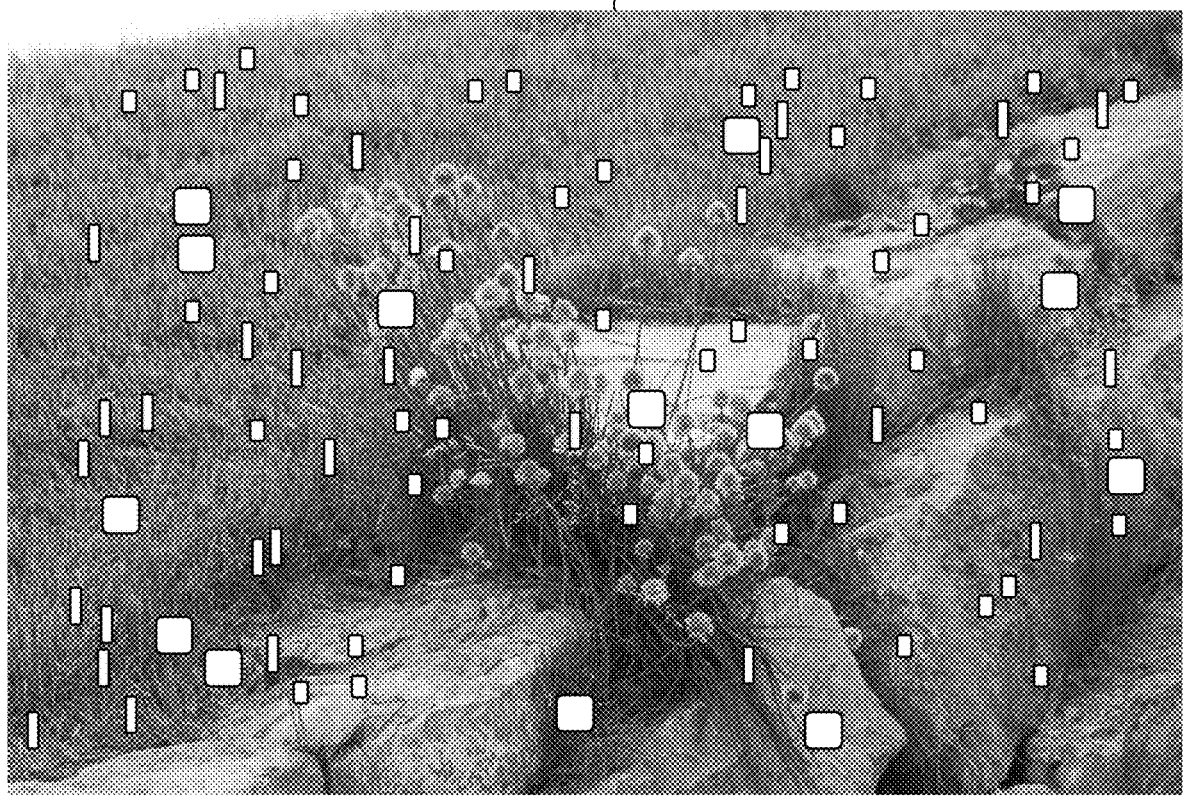
Figure 10C:
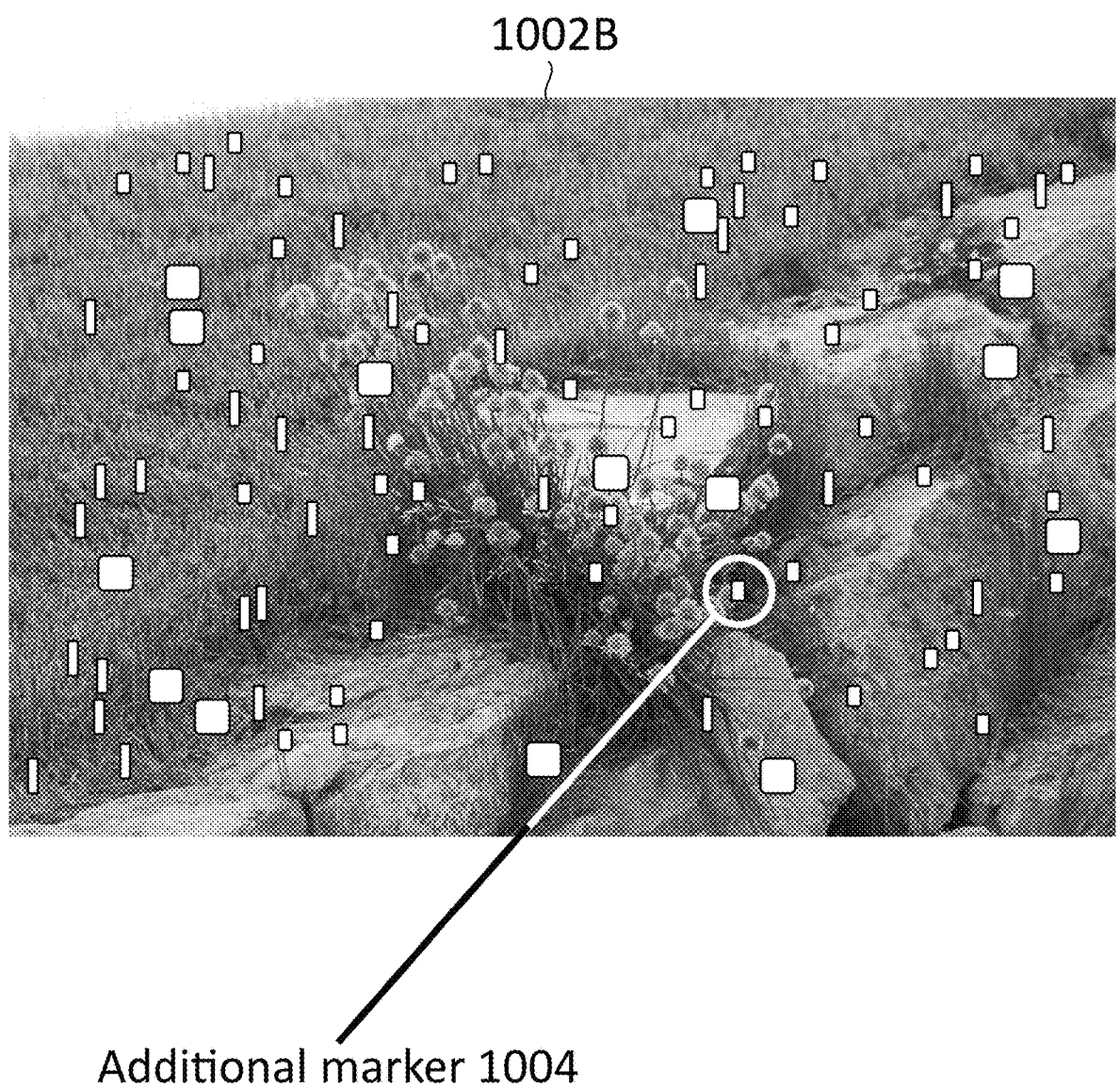
Figure 10D:

Consider, for example, FIGS. 10A-10D, which show an embodiment in which a plurality of visible markers obfuscate a hidden marker that would otherwise be visible in isolation. Specifically, FIG. 10A shows an image 1002A with a certain pattern of rectangular markers of various sizes, and an image 1002B in FIGS. 10B and 10C, which has the same underlying graphical content as image 1002A, and the same markers, except for one additional marker 1004. The additional marker 1004 is not noticeable in FIG. 10B relative to the image 1002A with its other markers (and thus FIG. 10C highlights the appearance of the additional marker 1004). The fact that the presence (or absence) of the additional marker 1004 is not noticeable can qualify that marker 1004 as a hidden marker, even though it would be perceptible to the naked eye if it were the only marker to appear in the image (see FIG. 10D).

The hidden marker and the visible marker encode information related to the video access event, as described above. In an embodiment, the information related to the video access event may comprise at least one of (i) an identity of the user 26; (ii) an address of the device 22, 24; and (iii) the timestamp.

In some embodiments, the first images and second images are mutually exclusive, i.e., the output images that comprise the visible marker do not comprise the hidden marker and vice versa. In other embodiments, the first images and the second images are not mutually exclusive, i.e., the hidden marker is comprised in the same output images that comprise the visible marker.

In a non-limiting example embodiment, the visible marker is embodied as a set of pixels (hereinafter a "visible set") in the second images. The visible set of pixels may occupy more than a predetermined threshold number of pixels. The predetermined threshold number of pixels may correspond to a lower threshold of visibility, which may be a constant stored in the memory 704. The visible set of pixels may occupy more than a predetermined percentage of pixels relative to the overall number of pixels in the image. There may also be a density characteristic such that in at least one area of a certain minimum size (e.g., 100×100 pixels) in the second images, there is at least a certain minimum number of pixels belonging to the visible set of pixels. The visible set of pixels may occupy a predetermined shape or pattern in the second images. For a given second image, the size, shape or pattern of the visible set of pixels may be based on graphical content of the original image corresponding to the given second image.

The visible set of pixels occupies a region of interest in the second images, where the region of interest has a position that can be defined by the X-Y boundaries of the visible set, its center or its center of mass, for example. The position of the region of interest may stay constant among the second images, or it may vary from one second image to another. The position of the region of interest (occupied by the visible set of pixels) within a particular second image may be set based on graphical content of the original image corresponding to the particular second image.

In another non-limiting example embodiment, rather than being embodied as a defined set of pixels in the second images, the visible marker may be embodied as a change (variation) in color balance or brightness among the output images (either the entire image (all pixels) of certain areas thereof)—this could be perceived as flashing or fading at a particular rate, or certain areas appearing darker or brighter than others, or certain areas being "bluer" or "greener" than others, etc. In this way, the visible marker is perceived through the observation of a succession of the output images on a display.

The visible marker may encode information related to the video access event. For example, in the case where the visible marker is embodied as a visible set of pixels in the second images, the information related to the video access event may be encoded in the pixel values, or in the shape, density or pattern of the pixels in the visible set of pixels. The information related to the video access event may also be encoded in the position of the region of interest and/or in variations in the position of the region of interest. In the case where the visible marker is embodied as a change in color balance or brightness in the output images, the information related to the video access even may be encoded in such change, all of which are perceptible to the user.

Turning now to the hidden marker, in a non-limiting example embodiment, it may be embodied as a set of pixels (hereinafter a "hidden set") in the first images. The hidden set of pixels may occupy less than a predetermined threshold number of pixels within the first images. The predetermined threshold number of pixels may correspond to an upper threshold of visibility, which may be stored as a constant in the memory 704. The hidden set of pixels may occupy less than a predetermined percentage of pixels relative to the overall number of pixels in a given one of the first images. There may also be a contiguity characteristic such that in at least one area of a certain minimum size (e.g., 100×100 pixels) in the first images, there is at most a certain maximum number of pixels belonging to the hidden set of pixels, and this could be combined with the constraint that there be at least a certain minimum number or percentage of pixels in the hidden set of pixels. Alternatively, the hidden set of pixels has at least a first predetermined threshold number or percentage of pixels but has less than a second predetermined pixel density per 1,000 contiguous pixels.

In other words, as far as the hidden marker is concerned, there have to be enough pixels dispersed within a certain area to be detectable by a computer but not enough to be perceptible to the naked eye. The hidden set of pixels may occupy a predetermined shape or pattern in the first images. For a given one of the first images, the size, shape or pattern of the hidden set of pixels may be based on graphical content of the original image that corresponds to that given first image.

The hidden set of pixels may occupy a region of interest in the first images having a certain position defined, e.g., by the X-Y boundaries of the region of interest, its center or its center of mass. The position of the region of interest may stay constant among the first images, or it may vary from one first image to another. The position of the region of interest (containing the hidden set of pixels) within a particular first image may be set based on graphical content of the original image corresponding to the particular first image.

The hidden marker may encode information related to the video access event. The information related to the video access event may comprise at least one of (i) an identity of the user 26; (ii) an address of the device 22, 24; and (iii) the timestamp. As such, the information related to the video access event that is encoded by the hidden marker may be the same as, or different from, the information related to the video access event that is encoded by the visible marker.

In the case where the hidden marker is a set of pixels in the first images, the information related to the video access event may be encoded in the pixel values, or in the shape, density or pattern of the pixels in the hidden set of pixels. The information related to the video access event may also be encoded in the position of the region of interest and/or in variations in the position of the region of interest.

It should be appreciated that where the visible marker and the hidden marker are embodied as a visible set of pixels and a hidden set of pixels, respectively, the hidden set of pixels corresponding to the hidden marker may be smaller (i.e., having fewer pixels) or less dense (e., having fewer pixels per unit area in a certain area) than the visible set of pixels corresponding to the visible marker. Also, in some embodiments, both the visible marker and the hidden marker may appear together in the same output images.

Figure 3A:
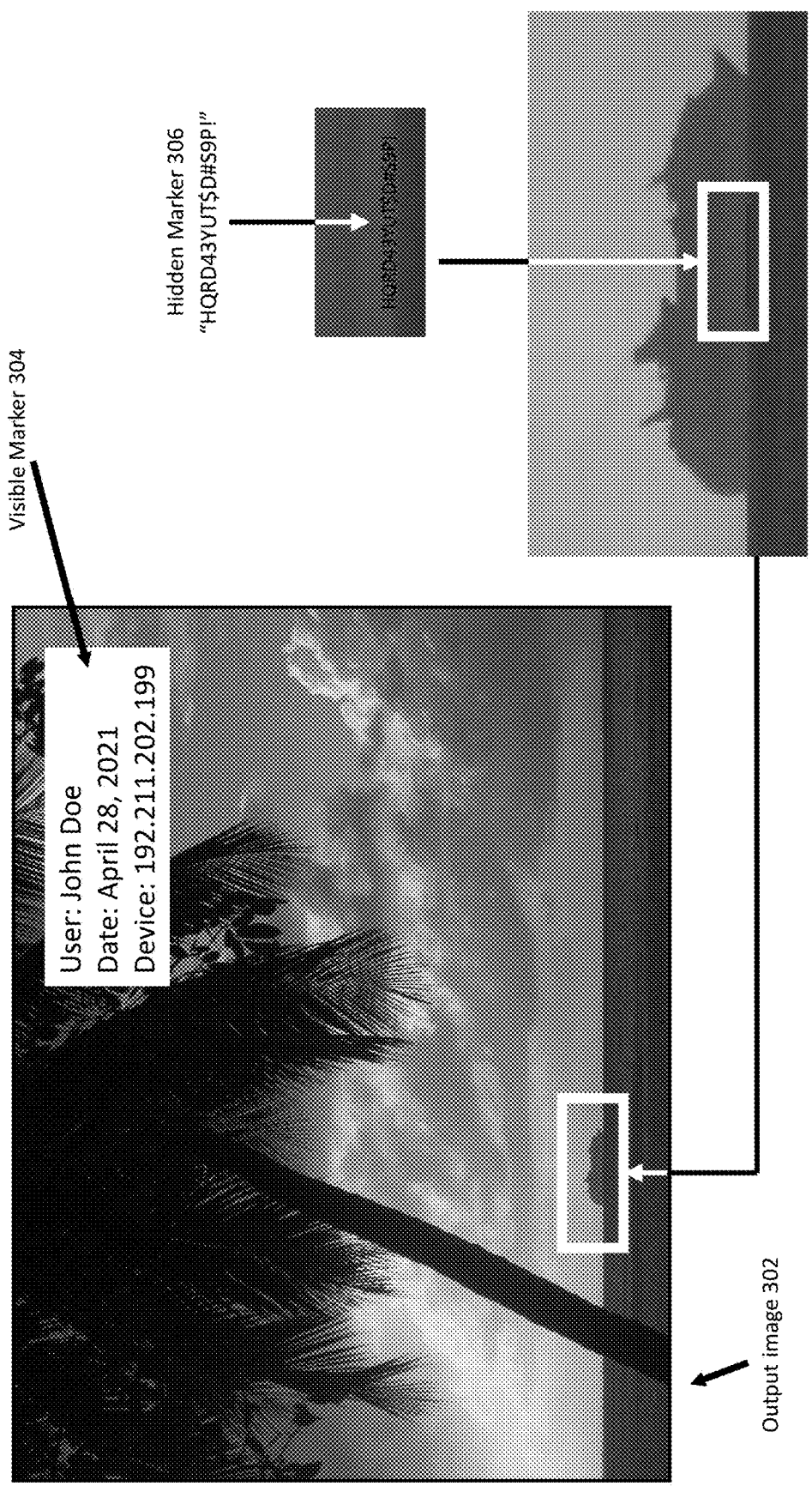
FIGS. 3A to 3C show examples of digital images comprising dual markers, in accordance with non-limiting embodiments.

Several non-limiting examples of the dual marker embodiment are now described. Firstly, with reference to FIG. 3A, there is shown the case where an image from the stream of original images has been modified by the video access manager to produce an output image 302 including a visible marker 304 and a hidden marker 306. The image 302 appears to show a boat on water, a palm tree and clouds. The visible marker 302 is located in the top right-hand portion of the image 302. The location may be based on a variety of factors, including the graphical content of the image 302.

The visible marker 304 encodes information related to a video access event, in this case related to a user, a date and a device. For its part, the hidden marker 306 is encoded as textual code that is embedded where the boat meets the water. The hidden marker is too small to be seen on the image 302 by the naked eye. Nevertheless, its presence can be detected by a graphics processing algorithm if there is sufficient contrast between the characters of the textual code and its surrounding graphical environment. Indeed, upon magnifying approximately 20×, this contrast can be seen in FIG. 3A. However, the characters in the textual code cannot be discerned from the unmagnified image as it appears on the screen of a computing device such as a console or a smart phone, for example. The textual code encoded by the hidden marker 306 may be related to the content of the visible marker 304 in various ways. In this case, the textual code may represent a hash of the video access event information presented by the visible marker 304. In other cases, the textual code may repeat the same information, or may provide different or complementary information.

Figure 3B:
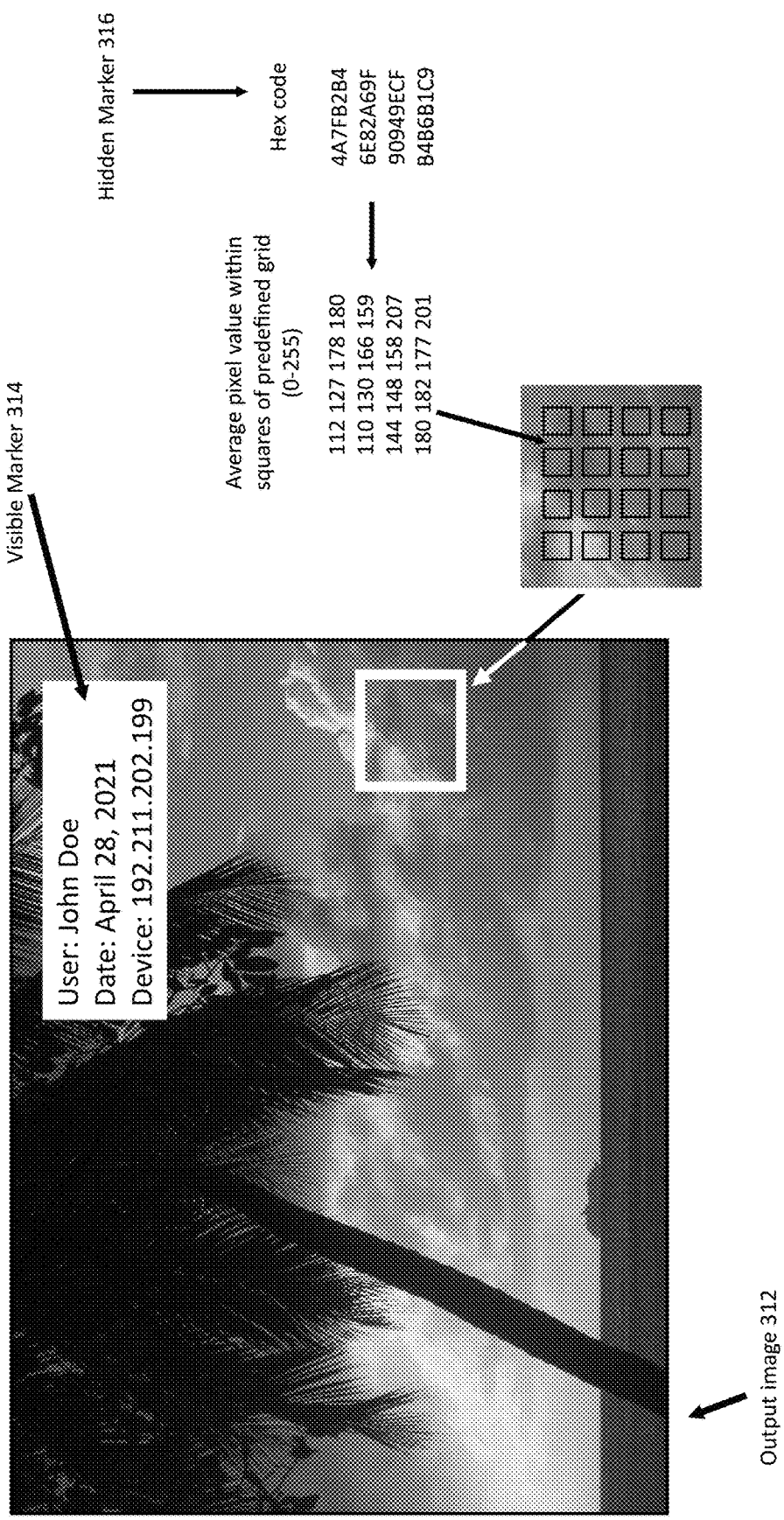

Secondly, with reference to FIG. 3B, there is shown another case where an image from the stream of original images has been modified by the video access manager to produce an output image 312 including a visible marker 314 and a hidden marker 316. The image 312 appears to show a boat on water, a palm tree and clouds. Here again, the visible marker 312 is located in the top right-hand portion of the image 302. The location may be based on a variety of factors, including the graphical content of the image 302. The visible marker 302 encodes information related to a video access event, in this case related to a user, a date and a device. For its part, the hidden marker 304 is a multi-value hex code that is manifested as an average intensity value of pixels within a grid of squares, each square corresponding to a respective hex value. This grid appears in a pre-determined location within the image 312, in this case in the clouds. By placing a grid at these known locations, a detector can measure the average intensity of the pixels within each square of the grid in order to obtain a value between, say 0 and 255; this value is converted into a hex code, and the concatenation of hex codes reveals a textual code encoded by the hidden marker 316. As before, the textual code encoded by the hidden marker 306 may be related to the content of the visible marker 304 in various ways. The textual code may represent a hash of the video access event information presented by the visible marker 304, or it may repeat of complement such information.

Figure 3C:
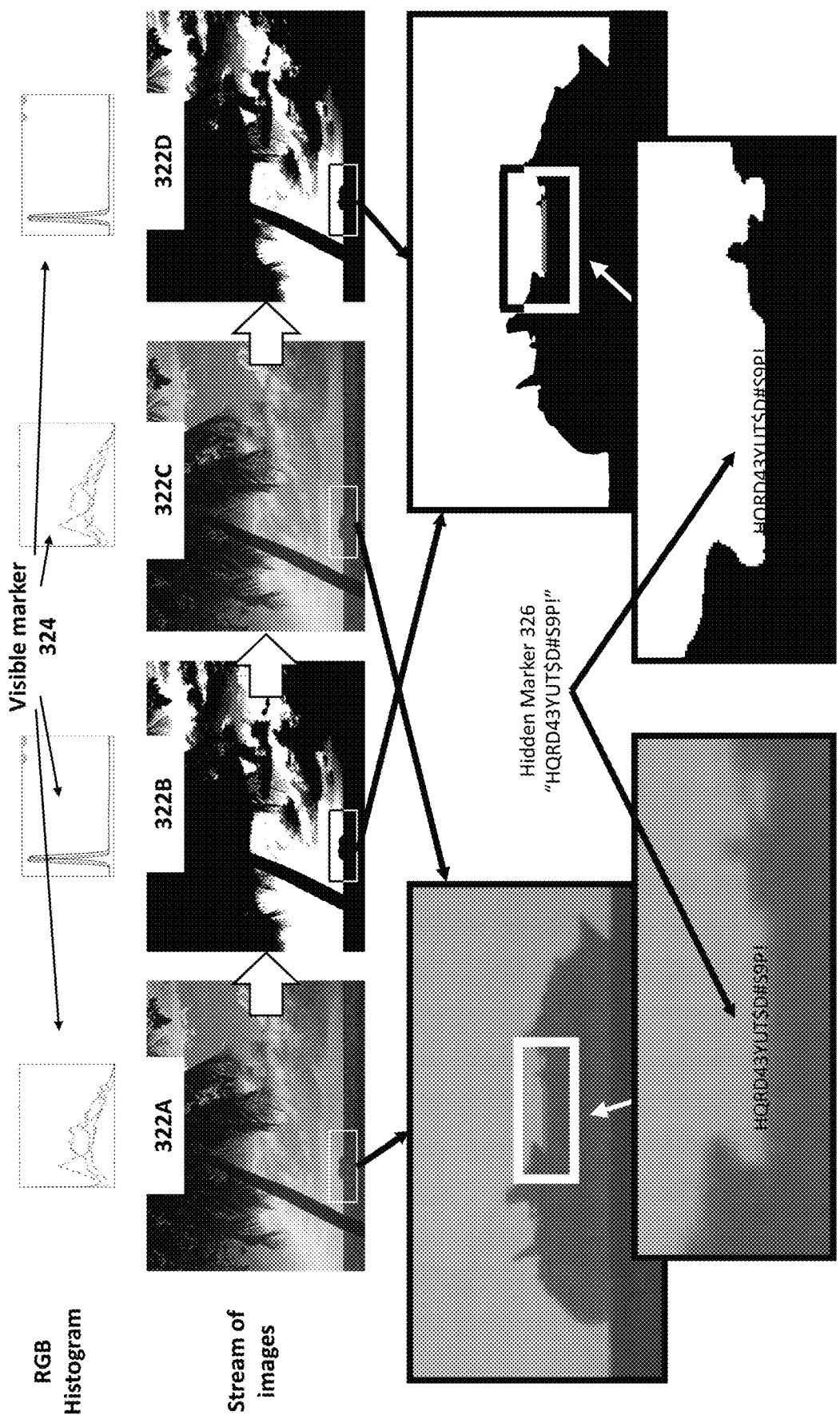

A third example is shown in FIG. 3C, where the there is shown the case where an image from the stream of original images has been modified by the video access manager to produce output images 322A, 322B, 322C, 322D including a visible marker 324 and a hidden marker 326. The images 322A-D appear to show a boat on water, a palm tree and clouds. The pixel value distribution (referred to as the RGB histogram) changes between images (or groups of images), which is observed by a user as "flickering", and therefore is a visible marker that serves as a deterrent to viewing or recording the images 322A-D. The rate or frequency of change in pixel value distribution may be based on a variety of factors, including the graphical content of the images 322A-D and the information related to the video access event. For its part, the hidden marker 324 is encoded as textual code that is embedded where the boat meets the water. The hidden marker is too small to be seen on the images 322A-D by the naked eye. Nevertheless, its presence can be detected by a graphics processing algorithm if there is sufficient contrast between the characters of the textual code and its surrounding graphical environment. Indeed, upon magnifying approximately 20×, this contrast can be seen in FIG. 3C. However, the characters in the textual code cannot be discerned from the unmagnified image as it appears on the screen of a computing device such as a console or a smart phone, for example. The textual code encoded by the hidden marker 326 may or may not be related to the content of the visible marker 324.

Figure 8:
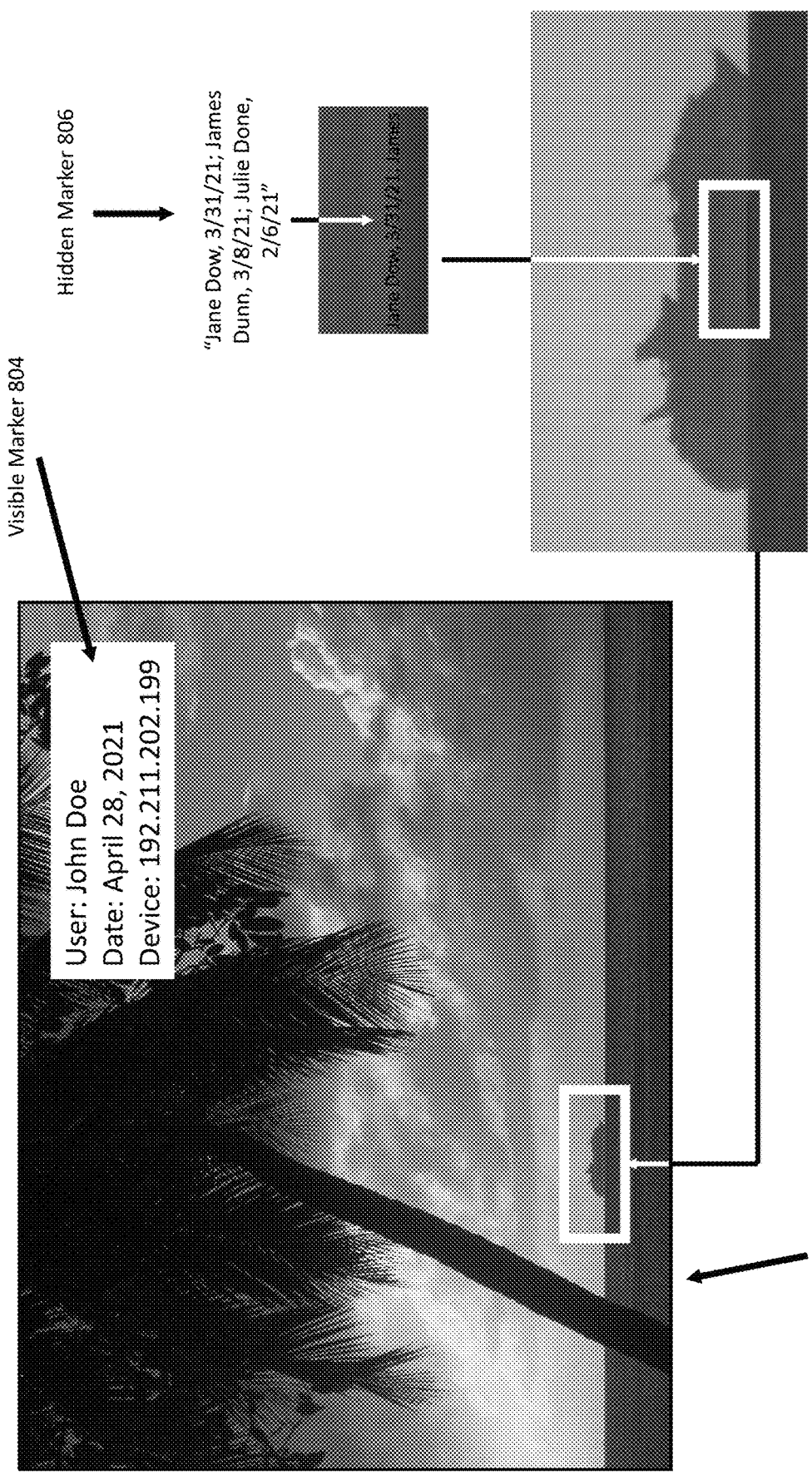
FIG. 8 shows an example of a digital image comprising additive dual markers, in accordance with a non-limiting embodiment.

Those skilled in the art will appreciate that where the original images already comprise an existing hidden marker and/or an existing visible marker, the video access manager 12 may be configured to add further markers (e.g., an additional hidden marker and/or an additional visible marker) in the process of creating the output images. The existing marker(s) may encode information related to an earlier video access event, whereas the added marker(s) may encode information related to the current video access event. In a non-limiting embodiment, as shown in the image 802 of FIG. 8, a newly added marker 804 (which is in this case a visible marker) appears at a different position in the output images than an existing marker 806 (which is in this case a hidden marker). Marker 804 include user, time and device information relating to the current video access event, whereas marker 806 (which is embedded as text) includes user and date information relating to past video access events. This can allow the preservation of an audit trail of video access events, effectively allowing a detector to eventually track down the source of a leak or unauthorized video access event.

Since a visible marker in the stream of output images is perceptible to the naked eye, and since such a visible marker encodes information related to the video access event, the user 26 (who views the stream of output images) is made aware that by distributing or recording the output images, the information related to the video access event would be distributed or recorded as well. Since the information related to the video access event may include the identity of the user 26 or the device 22, 24 used by the user 26, the visible marker acts as a deterrent for recording or redistribution by the user 26.

For its part, the hidden marker facilitates determining who accessed or recorded the output images (e.g., based on user, device, timestamp, etc.). This can be accomplished since the hidden marker remains in the output images even if they are manipulated to somehow remove the visible marker.

Figure 2:
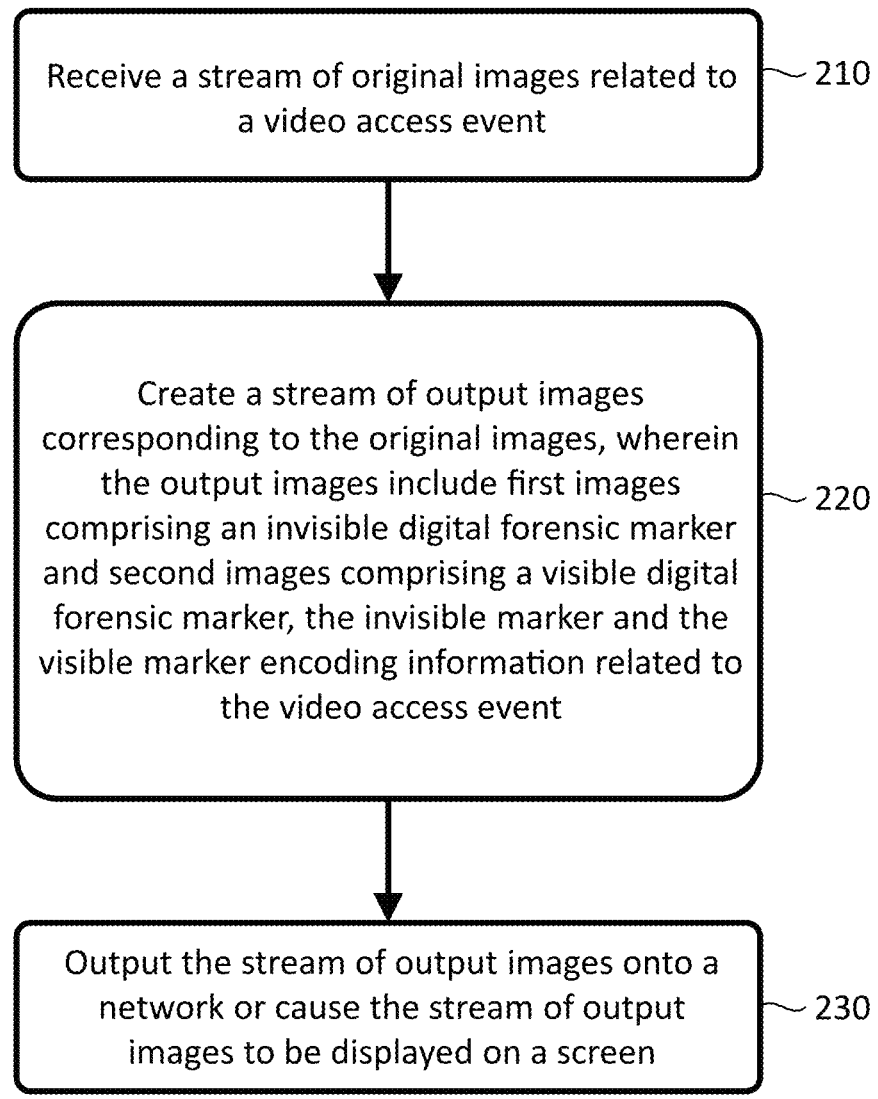
FIG. 2 is a flowchart showing steps in a video processing method for the embedding of dual digital forensic markers into a stream of original digital images, in accordance with a first non-limiting embodiment.

Thus, with reference to the flowchart in FIG. 2, a method has been described, whereby a stream of original images related to a video access event is received (step 210). A stream of output images corresponding to the original images is created (step 220), wherein the output images include first images comprising an invisible digital forensic marker and second images comprising a visible digital forensic marker, the invisible marker and the visible marker encoding information related to the video access event. At step 230, the stream of output images is output onto a network or is caused to be displayed on a screen.

A method for processing a stream of digital images containing one marker and potentially lacking another, related, marker is now described.

Detection of Hidden Marker

Figure 9:
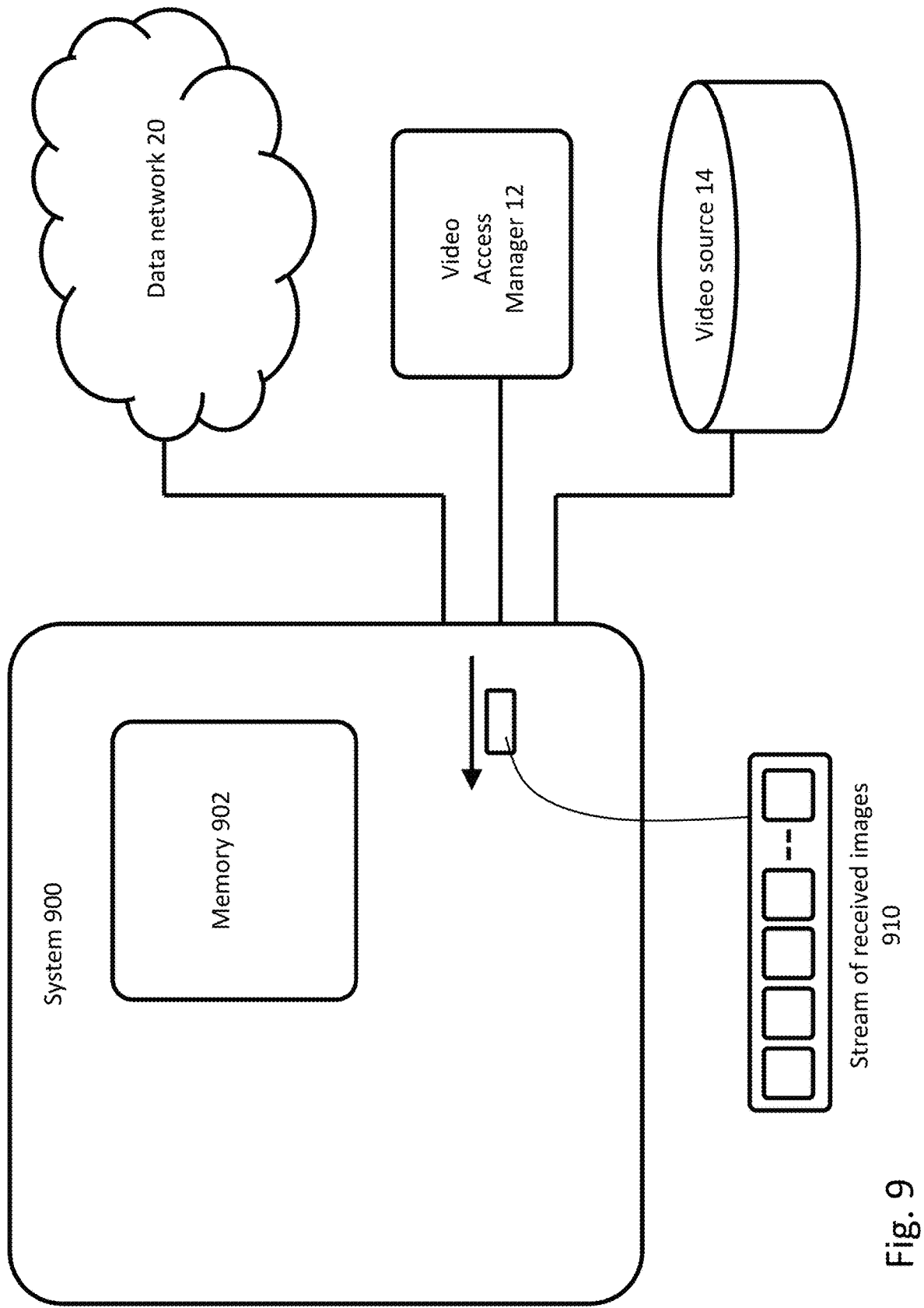
FIG. 9 is a block diagram of a system for processing digital images to determine the presence of related markers therein.

FIG. 9 shows a system 900 for processing video that includes a stream of received digital images 910, e.g., from the video source 14 or from the video access manager 12 or from another source altogether, e.g., via a data network.

It is possible that the received images 910 are similar to the output images 302, 312, 322A-322D described above in the sense of having been imprinted with a dual marker;

however, this fact is not known from visual inspection of the received images 910 alone. In other words, if the received images 910 do include a visible marker, they may lack a hidden marker—this would not be known to a user of the system 900. While such images might not seem problematic to identify, because the visible marker points to various information related to a video access event, it is possible that the visible marker was added to replace an earlier visible marker that encoded the true information related to an earlier, unauthorized video access event. As such, it is one function of the system 900 to identify such situations and extract, if possible, the true video access event information based on a hidden marker present in the received images 910.

On the other hand, if the received images 910 lack a visible marker, it could be that the received images 910 used to contain a dual marker (visible and hidden) but from which the visible marker was removed, or it could be that these images never had (and continue to lack) a hidden marker to begin with. The present system 900 is particularly suited to identifying the case where the received images 910 are the result of images that formerly contained a dual marker (visible and hidden) from which the visible marker was removed, as this would suggest that tampering may have occurred. The extraction of the hidden marker could therefore help pinpoint the user, device and/or timestamp associated with a video access event that, it can be assumed, a prior user was trying to hide. As such, this determination can trigger a stream of investigative actions to identify the source of a leak or other unauthorized activity associated with the video access event.

In particular, therefore, based on the stream of received images 910, the system 900 is configured to detect a first digital forensic marker comprised in the digital images (it is assumed that at least a first marker is present in the stream of received images 910). The system then determines whether the stream of received images 910 comprises a second digital forensic marker associated with the first marker. An action is taken based on the determining.

In particular, the taking of an action further to the determining may include outputting a signal 912 indicative of integrity or non-integrity of the stream of received images 910. For instance, if the determining reveals that the stream of received images 910 does comprise the second marker, the signal 912 may be configured to indicate integrity of the stream of received images 910, whereas if the determining reveals that the stream of received images 910 does not comprise the second marker, the signal 912 may be configured to indicate non-integrity of the stream of received images 910. In that case, i.e., if the stream of received images 910 comprises the first marker but does not comprise the second marker, the system 900 may output a signal to indicate that an attempt has been made to alter the images so as to cover up the existence of a second marker. This can trigger further investigation, based on user, device and/or timestamp information encoded in the first marker.

In some embodiments, the first marker (i.e., the one that is detected) is visible in the received images 910 and the second marker (i.e., the one that is sought based on the first marker) is hidden in the received images 910. In other embodiments, it may be the opposite. The meaning ascribed to "visible" and "hidden" may be the same as defined above with respect to the dual marker embodiment.

In some cases, detecting the first marker may include detecting the presence of a predetermined graphical pattern in the received images. Such graphical pattern may be known in advance and stored in a memory 902. As such, the system 900 may be configured for processing images to look for the predetermined graphical pattern.

Alternatively or in addition, the graphical pattern sought to be detected may have a property (e.g., size, location and pixel values) that is based on graphical content of at least one of the received images 910. The relationship between the graphical content (of the received images 910) and the property (of the graphical pattern sought to be detected) may be known in advance and stored in the memory 902. In particular, this relationship may be a "shared secret" that is known by the system 902 and the video access manager 12 and related to the manner in which to embed markers in images based on the graphical content of those images.

For example, if a portion of an image has high straight-line content, the graphical pattern may appear as being made up of curved lines, whereas if it has low straight-line content, it may appear as being made up of straight lines. In another example (e.g., output image 312), the shared secret is the location of a grid of squares (and the size of the squares), which is then used for the purposes of determining the average intensity value, which in turn is used to derive the marker (in this case one that is hidden).

In other cases, detecting the first marker may include detecting predetermined changes of a predetermined graphical pattern in the received images 910 or detecting a change in color balance or brightness in the received images. As such, the system 900 may be configured for processing images to determine their color balance or brightness.

It should be appreciated that the first marker may encode information related to a video access event, and therefore may encode information such as at least one of (i) an identity of a user; (ii) an address of a device; and (iii) a timestamp, as already described.

To determine whether the stream of received images 910 comprises the second marker, the system 900 may be configured to process the received images 910 in an attempt to detect the second marker. To identify which second marker to search for among the received images 910 based on the first marker, the system 900 may be configured to consult the memory 902 based on identifying information of the first marker. The first marker may thus carry or comprise information about the second marker (and, in particular, information regarding a property of the second marker). Such property may include at least one of the location, size, shape and graphical content (e.g., intensity, color, etc.) of the second marker. Additional information that relates the first and second markers, as used by the video access manager 12 when embedding the first and second markers into output images, can be sent to the system 900 and stored in the memory 902. For example, the first marker may graphically encode numbers which are the X-Y coordinates of the center of where the second marker should be. Knowing this can allow the system 900 to rapidly search for the second marker and reach a conclusion as to its presence or absence, and content if present.

It should be appreciated that the mere presence of the second marker in the received images 910 may not be sufficient to conclude integrity of the stream of received images 910. Rather, it may be necessary to decode the information carried in the second marker and to validate this information against information stored in the memory 902 or available over the network. For example, the second marker may be expected to encode a prime number plus X, and by verifying whether this is the case, the system 900 can assess whether the second marker is valid. This can help the system 900 to conclude integrity of the received images 910. In other cases (e.g., output images 302 and 322A-322D) the value encoded by the second marker may be a hash of the value encoded by the first marker. By carrying out a hash on the value encoded by the first marker and comparing this hash value to the value encoded by the second marker, the system 900 can verify whether the association between the first and second markers is valid.

Those skilled in the art will also appreciate that if the received images 910 include multiple combinations of visible and/or hidden markers, each encoding an associated set of video access event information, the above operations can be conducted for all such markers or combinations of markers, so as to extract the multiple associated sets of video access event information. This can allow reconstruction of a chain of video access events, effectively collecting an audit trail of video access events, allowing a comparison to authorized users, devices or timestamps, and the taking of consequent actions, as needed.

Figure 4:
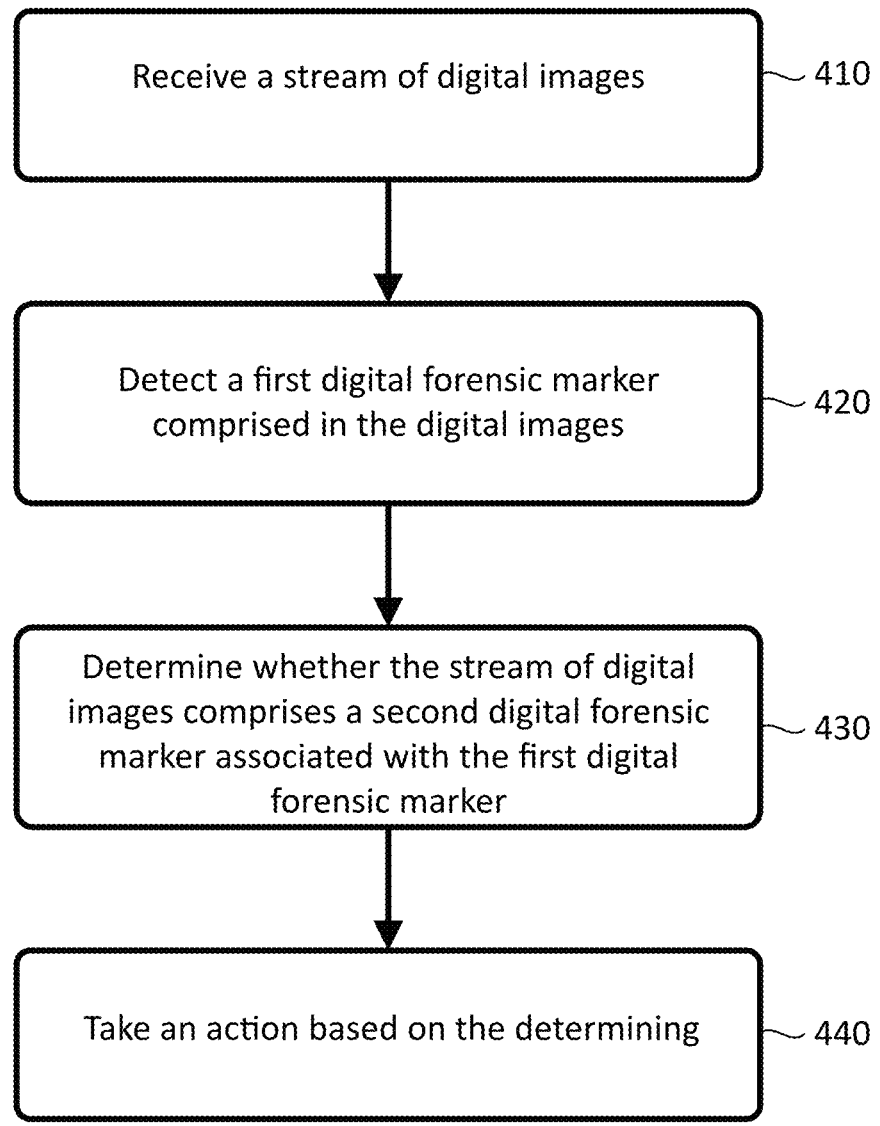
FIG. 4 is a flowchart showing steps in a method for processing a stream of digital images to determine its integrity based on the presence of dual digital forensic markers, in accordance with a non-limiting embodiment.

Thus, with reference to the flowchart in FIG. 4, a method has been described, whereby a stream of digital images is received (step 410). A first digital forensic marker comprised in the digital images is detected (step 420). At step 430, it is determined whether the stream of digital images comprises a second digital forensic marker associated with the first digital forensic marker. At step 440, an action is taken based on that which was determined.

Dynamic Marker Embodiment

In accordance with a second non-limiting embodiment (referred to as the "dynamic marker" embodiment), execution of the video processing method results in the output images including a digital forensic marker. The marker encodes information related to the video access event and, in this embodiment, it has at least one property that varies among the output images. The marker may be a visible marker or a hidden marker, as defined above.

In some embodiments, the marker is made up of a set of pixels in the output images, which may occupy a region of interest within certain ones of the output images. The at least one property that varies could include the number of pixels in the set and/or the position of the region of interest within the output images and/or a frequency content of the pixels in the set.

In other embodiments, the at least one property that varies among the output images could include a color balance and/or brightness of the output images.

In the case where the marker comprises a set of pixels in the output images, the information related to the video access event which is encoded in the marker could be encoded in pixel values of the pixels in the set of pixels and/or a size/position of the set of pixels. In other cases, the information related to the video access event which is encoded in the marker could be variations of color balance and/or brightness of the output images.

Regardless of the way in which the information related to the video access event is encoded in the marker, the size and/or position of the set of pixels in a given output image may be based on graphical content of the original image corresponding to the given output image. Also, a frequency content of the set of pixels in a given output image may be caused to vary based on graphical content of the original image corresponding to the given output image.

Similarly, a position of a region of interest occupied by the set of pixels within a given output image may be based on graphical content of the original image corresponding to the given output image.

Figure 6:
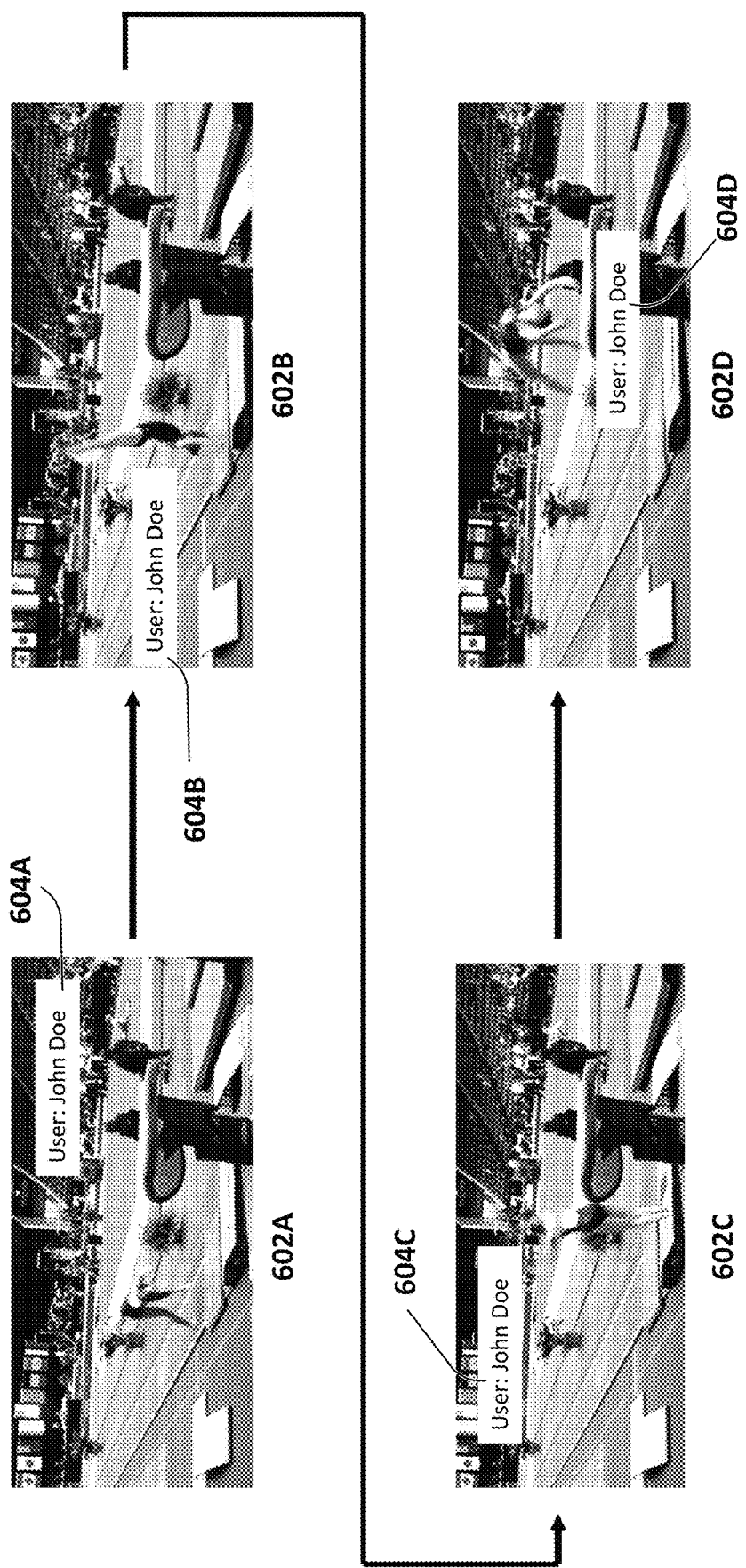
FIG. 6 shows an example of a stream of images comprising a dynamic marker, in accordance with a non-limiting embodiment.

Reference is made to the specific non-limiting example of FIG. 6, which shows output images 602A, 602B, 602C and 602D in a stream of output images. A corresponding marker 604A, 604B, 604C, 604D appears in each image, at a different position within the respective image. In this case, for illustrative purposes, the marker encodes the name of a user ("John Doe").

Figure 5:
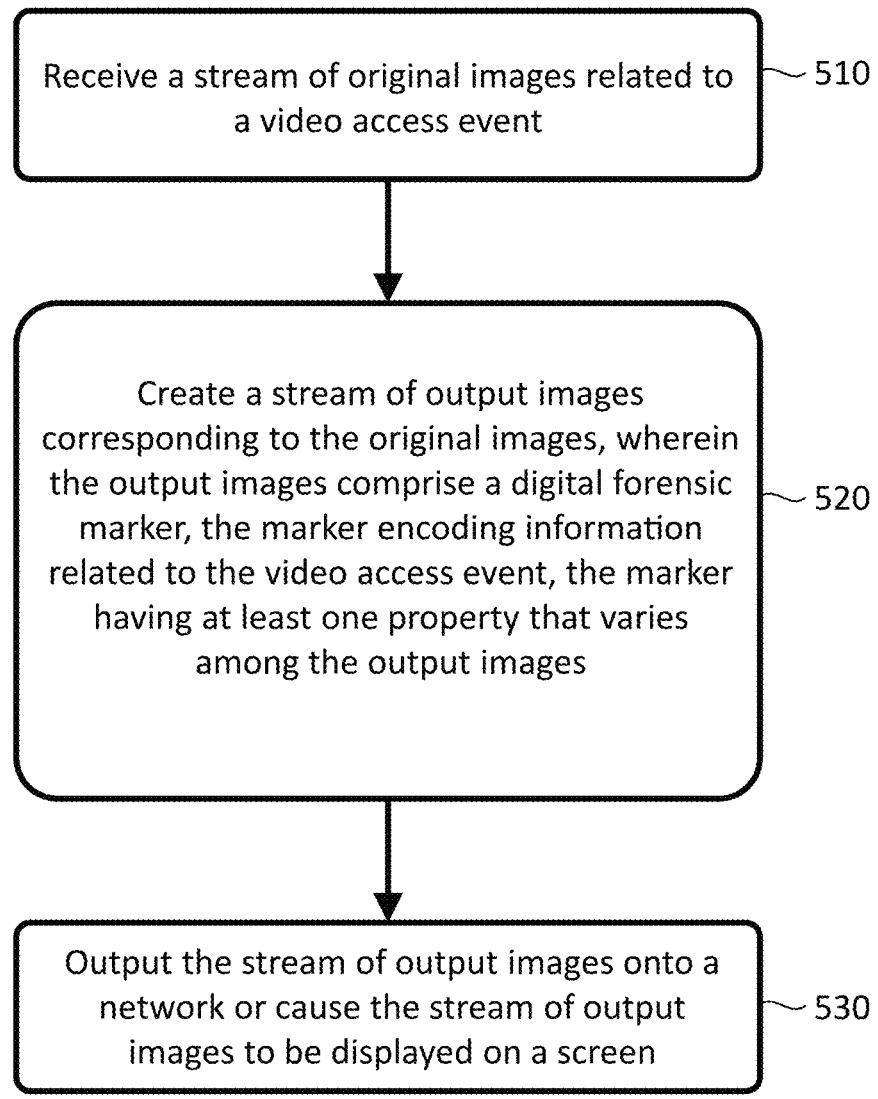
FIG. 5 is a flowchart showing steps in a video processing method for the embedding of a dynamic digital forensic marker into a stream of original digital images, in accordance with a second non-limiting embodiment.

Thus, with reference to the flowchart in FIG. 5, a method has been described, whereby a stream of original images related to a video access event is received (step 510). A stream of output images corresponding to the original images is created, wherein the output images comprise a digital forensic marker, the marker encoding information related to the video access event, the marker having at least one property that varies among the output images (step 520). At step 530, the stream of output images is output onto a network or caused to be displayed on a screen.

Those skilled in the art will appreciate that both of the above embodiments (i.e., the "dual marker" embodiment and the "dynamic marker" embodiment) may be combined. That is to say, execution of the video processing method may result in the output images including first images comprising a hidden digital forensic marker and second images comprising a visible digital forensic marker, wherein the markers encode information related to the video access event and wherein at least one of the markers has at least one property that varies among the output images.

The computer-readable storage medium referred to above can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, does not include transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from such computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer-readable program instructions for storage in the computer-readable storage medium within the respective computing/processing device.

The computer-readable program instructions for carrying out operations of the present disclosure may be assembler instructions, instruction-set-architecture (ISA) instructions, machine instructions, machine dependent instructions, microcode, Firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer-readable program instructions to personalize the electronic circuitry, in order to perform aspects of the present disclosure.

Aspects of the present disclosure are described herein with reference to flowchart/signal flow illustrations and/or block diagrams of methods, apparatus (systems), and computer program products according to various embodiments. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It should be appreciated that throughout the specification, discussions utilizing terms such as "processing", "computing", "calculating", "determining", "analyzing" or the like, can refer to the action and/or processes of a computer or computing system, or similar electronic computing device, that manipulate and/or transform data represented as physical, such as electronic, quantities into other data similarly represented as physical quantities.

Additionally, reference throughout this disclosure to "one embodiment," "exemplary embodiment," or "an embodiment" means that a particular feature, structure or characteristic described in connection with the embodiment is included in at least one embodiment of the present disclosure. Thus, appearances of the phrases "in one embodiment," "in an exemplary embodiment," or "in an embodiment" in various places throughout this specification are not necessarily all referring to the same embodiment, although this may be the case in some instances. Furthermore, the particular features, structures or characteristics may be combined in any suitable manner, as would be apparent to one of ordinary skill in the art from this disclosure, in one or more embodiments. Similarly it should be appreciated that, in the above description of example embodiments, various features are sometimes grouped together in a single embodiment, figure, or description thereof for the purpose of streamlining the disclosure and aiding in the understanding of one or more of the various aspects. This method of disclosure, however, is not to be interpreted as reflecting an intention more features are features are required than are expressly recited in each claim. Rather, as the following claims reflect, aspects may lie in less than all features of a single foregoing disclosed embodiment. Thus, the claims following the Detailed Description are hereby expressly incorporated into this Detailed Description, with each claim standing on its own as a separate embodiment. Furthermore, while some embodiments described herein include some but not other features included in other embodiments, combinations of features of different embodiments are meant to be within the scope of the disclosure, and form different embodiments, as would be understood by those in the art. For example, in the following claims, any of the claimed embodiments can be used in any combination.

As used herein, unless otherwise specified, the use of the ordinal adjectives "first", "second", "third", etc., to describe a common object or step, merely indicate that different instances of like objects or steps are being referred to, and are not intended to imply that the objects or steps so described must be in a given sequence, either temporally, spatially, in ranking, or in any other manner.

It is noted that various individual features may be described only in one exemplary embodiment herein. The particular choice for description herein with regard to a single exemplary embodiment is not to be taken as a limitation that the particular feature is only applicable to the embodiment in which it is described. All features described herein may be equally applicable to, additive, or interchangeable with any or all of the other exemplary embodiments described herein and in any combination or grouping or arrangement. In particular, use of a single reference numeral herein to illustrate, define, or describe a particular feature does not mean that the feature cannot be associated or equated to another feature in another drawing figure or description. Further, where two or more reference numerals are used in the figures or in the drawings, this should not be construed as being limited to only those embodiments or features, they are equally applicable to similar features or not a reference numeral is used or another reference numeral is omitted.

Also, when the phrase "at least one of A and B" is used, this phrase is intended to and is hereby defined as a choice of A or B or both A and B, which is similar to the phrase "and/or". Where more than two variables are present in such a phrase, this phrase is hereby defined as including only one of the variables, any one of the variables, any combination of any of the variables, and all of the variables.

The foregoing description and accompanying drawings illustrate the principles and modes of operation of certain embodiments. However, these embodiments should not be considered limiting. Additional variations of the embodiments discussed above will be appreciated by those skilled in the art and the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A computer-implemented video processing method, comprising:
    receiving a stream of original images related to a video access event;
    creating a stream of output images corresponding to the original images, wherein the output images include first images comprising a hidden digital forensic marker and second images comprising a visible digital forensic marker, the hidden marker and the visible marker encoding information related to the video access event, wherein the hidden marker encodes information regarding a property of the visible marker or the visible marker encodes information regarding a property of the hidden marker; and
    outputting the stream of output images onto a network or causing the stream of output images to be displayed on a screen.

2. The method defined in claim 1, further comprising receiving a request for video access, wherein the video access event comprises said request.

3. The method defined in claim 2, wherein the video access event is characterized by at least one of (i) a user associated with the request; (ii) a device associated with the request; and (iii) a timestamp associated with the request, and wherein the information related to the video access event comprises at least one of (i) an identity of the user; (ii) an address of the device; and (iii) the timestamp.

4. The method defined in claim 2, wherein the request identifies a requesting user.

5. The method defined in claim 2, further comprising accessing a video source based on the request to obtain the stream of original images.

6. The method defined in claim 1, wherein the visible marker comprises a set of pixels in the second images.

7. The method defined in claim 6, wherein the set of pixels occupies more than a predetermined threshold number of pixels or percentage of pixels.

8. The method defined in claim 6, wherein the information related to the video access event is encoded in pixel values of the pixels in the set of pixels.

9. The method defined in claim 6, wherein the set of pixels occupies a region of interest whose position varies among the second images.

10. The method defined in claim 9, further comprising setting the position of the region of interest within a particular second image based on graphical content of the original image corresponding to the particular second image.

11. The method defined in claim 9, wherein the information related to the video access event is encoded in variations of the position of the region of interest.

12. The method defined in claim 1, wherein the first and second images are not mutually exclusive and wherein the visible marker comprises changes in color balance or brightness among the output images.

13. The method defined in claim 1, wherein the hidden marker comprises a set of pixels in each of the first images.

14. The method defined in claim 13, wherein the information related to the video access event is encoded in pixel values of the pixels in the set of pixels.

15. The method defined in claim 13, wherein the set of pixels occupies less than a predetermined threshold number of pixels or percentage of pixels in each of the first images.

16. The method defined in claim 13, wherein the set of pixels occupies at least a first predetermined threshold number or percentage of pixels in each of the first images and has less than a second predetermined pixel density per 1,000 contiguous pixels in each of the first images.

17. The method defined in claim 13, wherein the set of pixels occupies a region of interest whose position varies among the first images.

18. The method defined in claim 17, further comprising setting the position of the region of interest within a particular first image based on graphical content of the original image corresponding to the particular first image.

19. The method defined in claim 17, wherein the information related to the video access event is encoded in variations of the position of the region of interest.

20. The method defined in claim 1, wherein the hidden marker comprises a first set of pixels in a given one of the second images and wherein the visible marker comprises a set of pixels in a given one of the first images, the first set having fewer pixels than the second set.

21. The method defined in claim 1, wherein the first and second images are not mutually exclusive and wherein the visible marker and the hidden marker appear together in the same ones of the output images.

22. A video processing method, comprising:
    receiving a stream of digital images;

detecting a first digital forensic marker comprised in the digital images;

determining whether the stream of digital images comprises a second digital forensic marker associated with the first digital forensic marker; wherein one of the first and second markers is noticeable in the digital images and wherein the other of the first and second markers is imperceptible in the digital images, wherein the first marker comprises information regarding a property of the second marker, taking an action based on the determining, and outputting the stream of digital images onto a network or causing the stream of digital images to be displayed on a screen.

23. The method defined in claim 22, further comprising consulting a memory based on the first marker to identify the second marker associated with the first marker.

24. The method defined in claim 22, wherein determining whether the stream of digital images comprises the second marker comprises processing the digital images in an attempt to detect the second marker.

25. The method defined in claim 22, wherein taking an action comprises outputting a signal indicative of integrity or non-integrity of the stream of digital images.

26. The method defined in claim 25, wherein if the determining reveals that the stream of digital images comprises the second marker, the signal is indicative of integrity of the stream of digital images.

27. The method defined in claim 25, wherein if the determining reveals that the stream of digital images does not comprise the second marker, the signal is indicative of non-integrity of the stream of digital images.

28. The method defined in claim 22, wherein the property of the second marker comprises at least one of the location, size and content of the second marker.

29. The method defined in claim 22, wherein detecting the first marker comprises detecting presence of a predetermined graphical pattern in the digital images.

30. The method defined in claim 22, wherein the first marker encodes information related to a video access event.

31. The method defined in claim 30, wherein the information related to the video access event includes at least one of (i) an identity of a user; (ii) an address of a device; and (iii) a timestamp.

32. A non-transitory computer-readable storage medium comprising computer-readable instructions which, when executed by at least one processor of a computing apparatus, cause the computing apparatus to carry out a method that includes:

receiving a stream of original images related to a video access event;

creating a stream of output images corresponding to the original images, wherein the output images include first images comprising a hidden digital forensic marker and second images comprising a visible digital forensic marker, the hidden marker and the visible marker encoding information related to the video access event, wherein the hidden marker encodes information regarding a property of the visible marker or the visible marker encodes information regarding a property of the hidden marker; and outputting the stream of output images onto a network or causing the stream of output images to be displayed on a screen.

* * * * *

UNITED STATES PATENT AND TRADEMARK OFFICE
CERTIFICATE OF CORRECTION

| | | |
|---|---|---|
| PATENT NO. | : 12,299,765 B2 | Page 1 of 1 |
| APPLICATION NO. | : 17/244194 | |
| DATED | : May 13, 2025 | |
| INVENTOR(S) | : Pierre Racz | |

It is certified that error appears in the above-identified patent and that said Letters Patent is hereby corrected as shown below:

On the Title Page

Item (73) Assignee heading:
"GENETIC INC."
Should be:
-- GENETEC INC. --

Signed and Sealed this
Sixteenth Day of September, 2025

Coke Morgan Stewart
*Acting Director of the United States Patent and Trademark Office*